United States Patent [19]

Prenatt et al.

[11] 4,217,708
[45] Aug. 19, 1980

[54] CONVERTIBLE SNOW REMOVING AND GRASS CUTTING DEVICE

[75] Inventors: Harlan E. Prenatt, 650 Fairborn Rd., Cincinnati, Ohio 45240; Mark E. Prenatt, Ohio

[73] Assignee: by said Mark E. Prenatt said Harlan E. Prenatt, Cincinnati, Ohio

[21] Appl. No.: 13,428

[22] Filed: Feb. 21, 1979

[51] Int. Cl.² .................................. E01H 5/04
[52] U.S. Cl. ............................ 37/43 L; 56/289; 56/320.1
[58] Field of Search ............. 37/43 R, 43 L, 53; 15/328, 338; 56/320.1, 320.2, 289

[56] References Cited

U.S. PATENT DOCUMENTS

| | | | |
|---|---|---|---|
| 1,588,745 | 6/1926 | Kear et al. | 37/43 L X |
| 2,752,699 | 7/1956 | Gustafson | 37/43 L |
| 2,836,029 | 5/1958 | Johnson | 37/43 L |
| 2,969,634 | 1/1961 | Lannert | 37/43 L X |
| 2,984,919 | 5/1961 | Stoddard | 37/43 L X |
| 3,029,533 | 4/1962 | Schwanke et al. | 37/43 L |
| 3,043,036 | 7/1962 | Trojanek | 37/43 L X |
| 3,142,913 | 8/1964 | Jacob | 37/43 L |
| 3,373,514 | 3/1968 | Forren | 37/43 L |
| 3,562,932 | 2/1971 | Rautio | 37/43 L |
| 3,995,348 | 12/1976 | Chernosky | 37/43 L X |

*Primary Examiner*—E. H. Eickholt
*Attorney, Agent, or Firm*—James W. Pearce; Roy F. Schaeperklaus

[57] ABSTRACT

A device for removing snow which is convertible into a lawn mower and includes a housing of inverted cup shape including an upright annular wall and a bottom plate removably mounted on the housing to close the lower side thereof. An inlet opening is provided in the upright wall, and a hollow scoop is removably mounted on the housing in communication with the inlet opening. A substantially horizontal bar is rotatably mounted inside the housing. Buckets at end portions of the bar engage snow entering the housing through the inlet opening and eject the snow through a tangential discharge conduit communicating with the interior of the housing.

5 Claims, 21 Drawing Figures

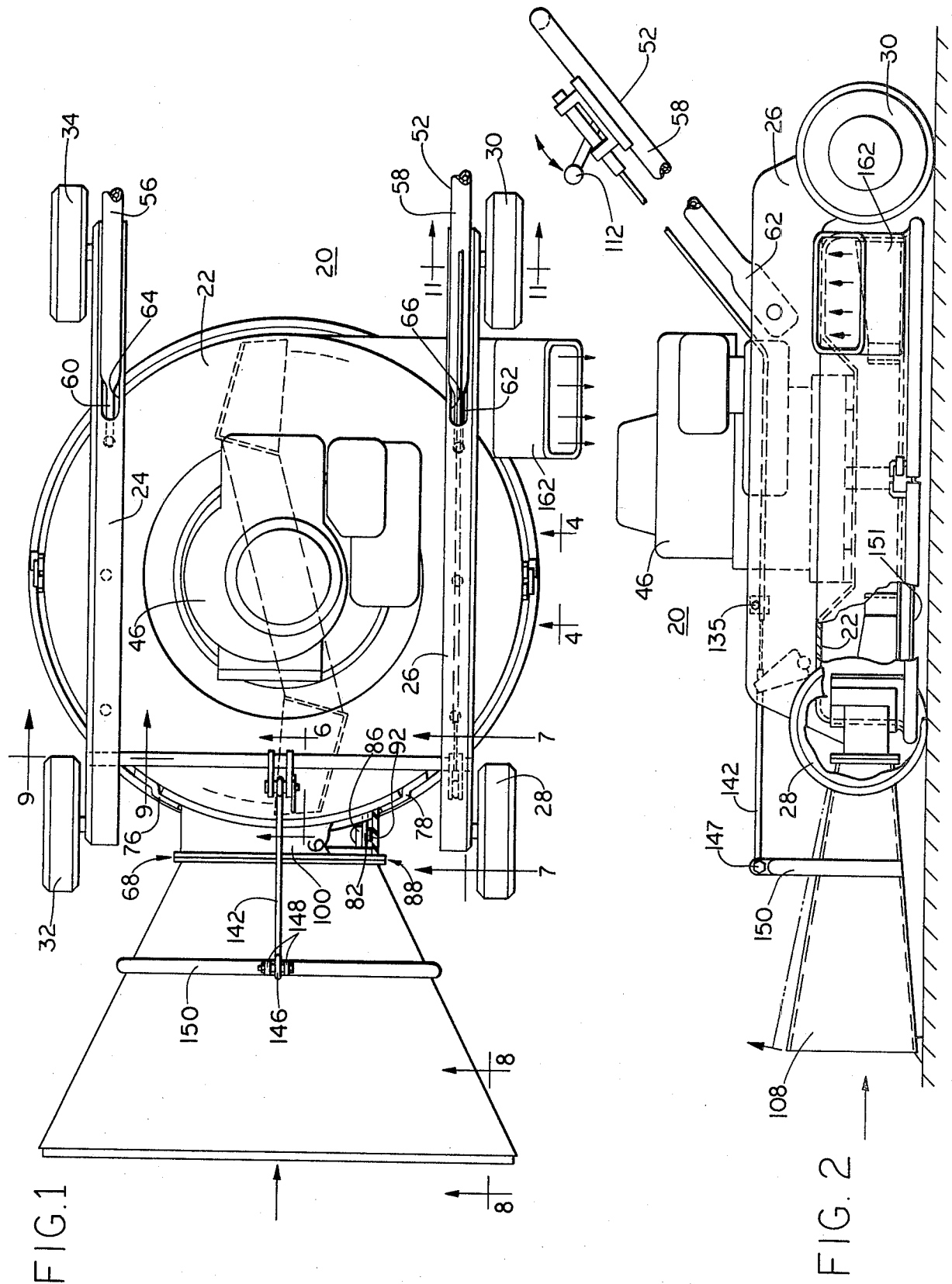

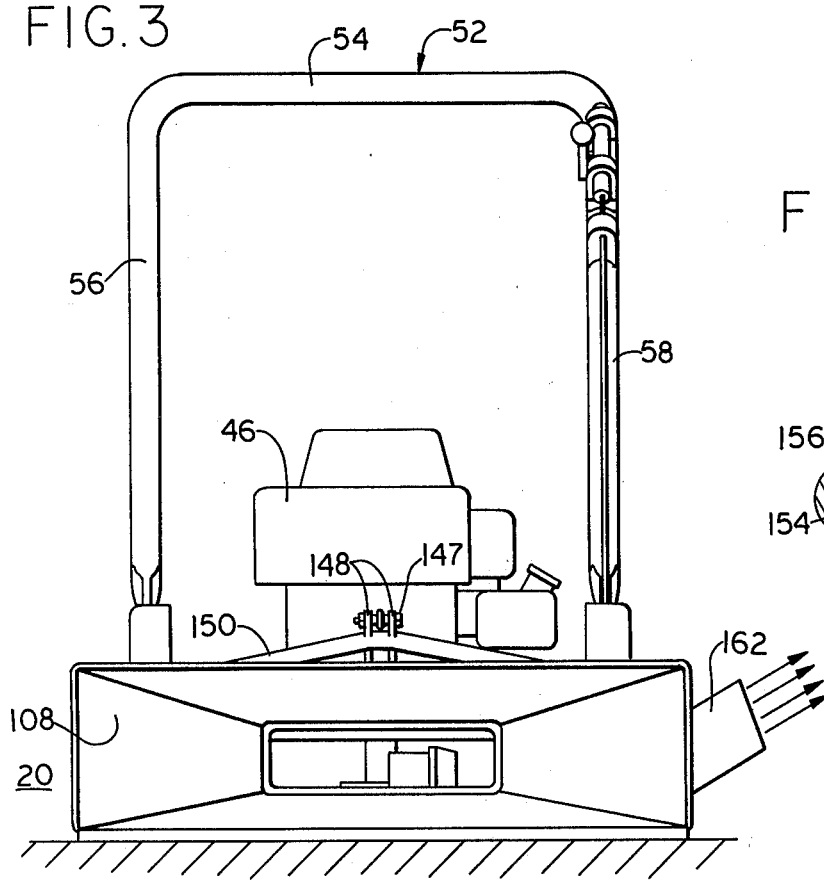
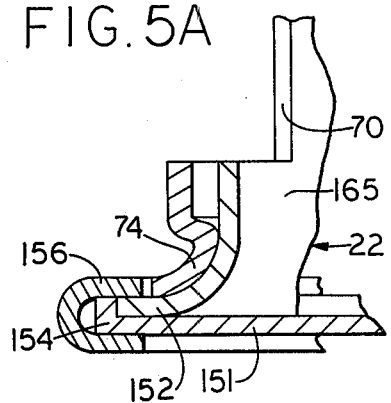
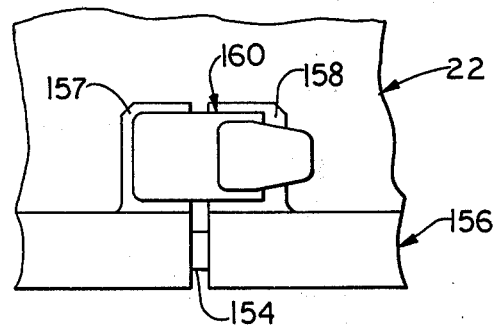
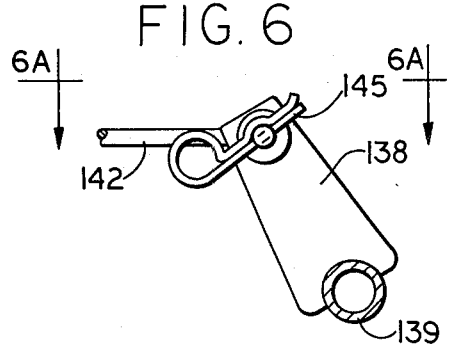
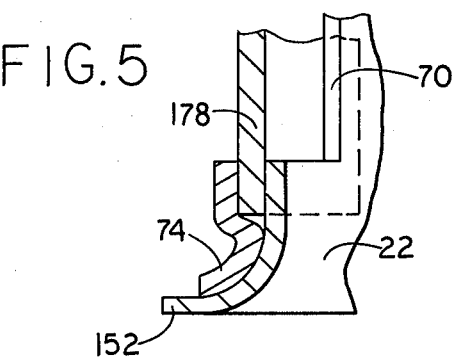
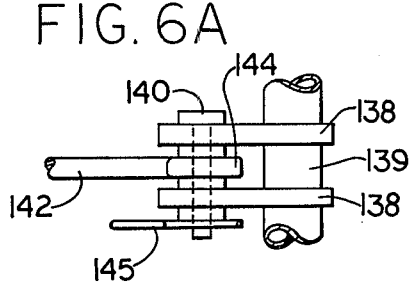

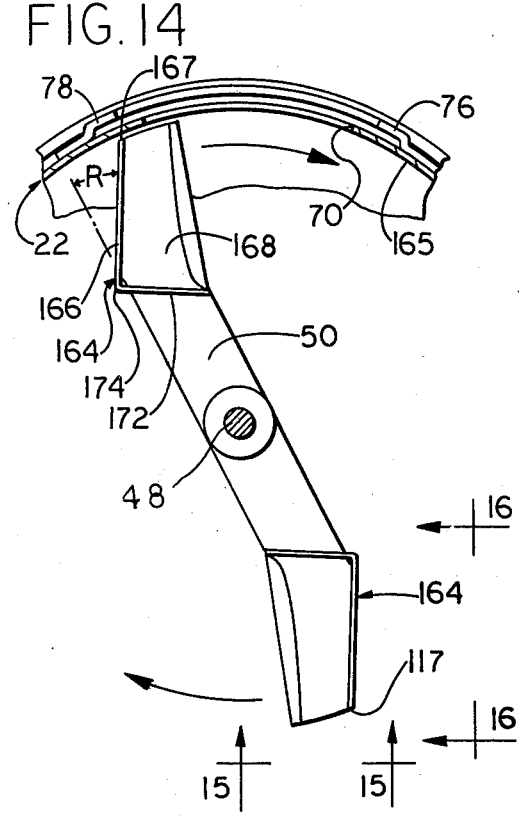
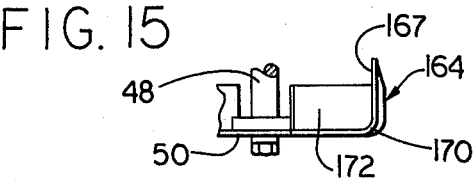
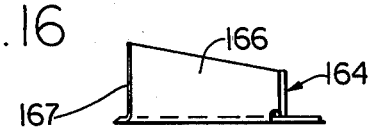
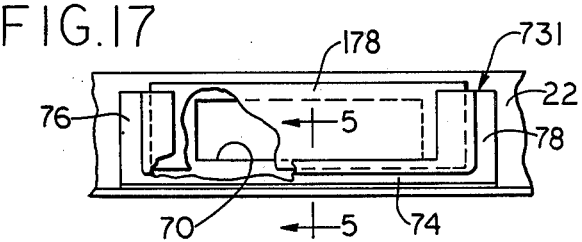
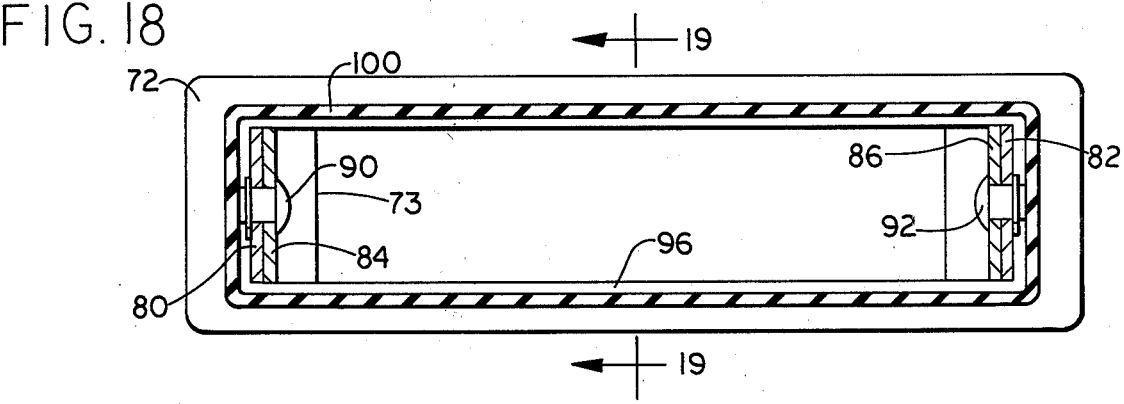
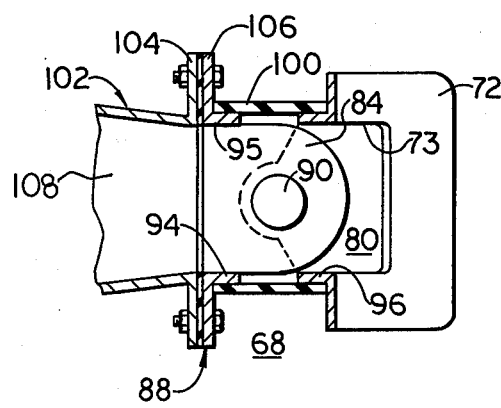

CONVERTIBLE SNOW REMOVING AND GRASS CUTTING DEVICE

This invention relates to a snow removing device. More particularly, this invention relates to a snow removing device which can be converted into a lawn mowing device.

An object of this invention is to provide a snow removing device which can project snow to one side and which can readily be converted to a lawn mower which projects grass cuttings to one side.

This invention represents an improvement over devices such as those shown in the following U.S. Pat. Nos.: Stoddard 2,984,919, Schwanke et al. 3,029,533, Wildes 3,064,369, Jacob 3,142,913, Florido 3,316,696, Forren 3,373,514, Beckner 3,775,878, and Garriott 3,982,337.

Briefly, this invention provides a snow removing device which includes an upright shaft which carries a bar on which snow catching buckets are mounted. A housing having an open bottom surrounds the bar and the snow catching buckets. A removable scoop assembly guides the snow into the housing through an intake opening in a side wall of the housing as the device is advanced. The shaft is rotated to rotate the bar and the snow catching buckets to cause the snow to be ejected through a tangential opening in the housing. A removable bottom plate closes the underside of the housing to prevent discharge of the snow onto the path along which the device is advanced. When the device is to be used as a lawn mower, the scoop assembly is removed, the intake opening is closed with an appropriate plate, the bottom plate is removed, and the device can function as a conventional lawn mower. Leading edge portions of the bar can be sharpened to provide grass cutting edges.

The above and other objects and features of the invention will be apparent to those skilled in the art to which this invention pertains from the following detailed description and the drawings, in which:

FIG. 1 is a top plan view of a snow removing device constructed in accordance with an embodiment of this invention, only a fragmentary portion of a handle thereof being shown;

FIG. 2 is a view partly in side elevation and partly in section of the device shown in FIG. 1;

FIG. 3 is a view in front elevation of the device shown in FIGS. 1 and 2;

FIG. 4 is a fragmentary view on an enlarged scale looking in the direction of the arrows 4—4 in FIG. 1;

FIG. 5 is an enlarged view in section taken on the line 5—5 in FIG. 17;

FIG. 5A is a view in section taken on the same line as FIG. 5 but with a closure plate removed and a bottom plate in position;

FIG. 6 is a fragmentary view in section taken on an enlarged scale on the line 6—6 in FIG. 1;

FIG. 6A is a fragmentary top plan view looking in the direction of the arrows 6A—6A in FIG. 6;

FIG. 14 is a fragmentary view in section showing a blade assembly of the device;

FIG. 15 is a view in elevation looking in the direction of the arrows 15—15 in FIG. 14;

FIG. 16 is a view in elevation looking in the direction of the arrows 16—16 in FIG. 14;

FIG. 17 is a fragmentary view in front elevation of the device with the throat assembly removed, a closure plate being shown in mounted position, parts of the closure plate and of a support therefor being broken away for clarity;

FIG. 18 is a view in section taken on the line 18—18 in FIG. 12; and

FIG. 19 is a view in section taken on the line 19—19 in FIG. 18.

In the following detailed description and the drawings, like reference characters indicate like parts.

Figure 11:
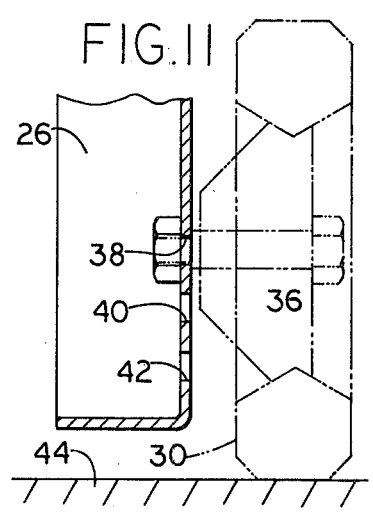
FIG. 11 is a view in section taken on an enlarged scale on the line 11—11 in FIG. 1, a wheel and wheel support being shown in double-dot-dash lines.

In FIGS. 1–3 inclusive is shown a convertible snow removing device 20 constructed in accordance with an embodiment of this invention. The snow removing device includes a main housing 22 of generally inverted cup shape which is supported by main frames 24 and 26 mounted on the upper face of the main housing 22. The main frames 24 and 26 are supported by wheels 28, 30, 32 and 34. Each of the wheels is rotatably mounted on a shaft 36, as shown in FIG. 11. The shaft 36 is mounted in one of a series of vertically spaced openings 38, 40 and 42 in the associated main frame. The height of the main housing above a supporting surface 44 can be adjusted by movement of the shaft between the openings 38, 40 and 42. An appropriate motor 46 is mounted on the main housing 22 and supports an upright shaft 48 (FIG. 14) on which a rotating bar 50 is mounted.

The device can be advanced by pushing a main handle 52 (FIGS. 1–3). The main handle 52 includes a cross bar portion 54, elongated arms 56 and 58, and flattened end portions 60 and 62. The end portions 60 and 62 are pivotally mounted inside openings 64 and 66 in upper flanges of the main frames 24 and 26, respectively.

Figure 12:
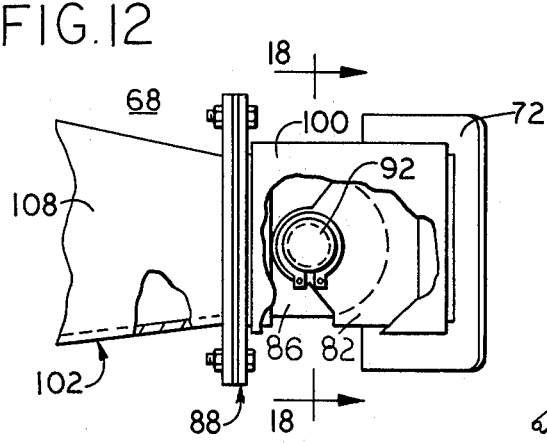
FIG. 12 is a fragmentary view in side elevation on an enlarged scale of a scoop assembly of the device.

Snow enters the device through an intake scoop assembly 68, which is mounted on the main housing 22. As shown in FIG. 14, an opening 70 is formed in an upright annular wall 165 of the main housing 22. The scoop assembly 68 includes a plate member 72 (FIG. 12) which is removably mounted on the wall of the main housing 22 and has a plate opening 73 (FIG. 18), which is aligned with the housing opening 70. The plate member 72 is supported by a support assembly 731 (FIG. 17) which is mounted on the wall 165 of the main housing 22. The support assembly 731 includes a lower generally horizontal Z-shaped main portion 74 (FIG. 5A) below the opening 70 and side Z-shaped portions 76 and 78 at sides of the opening 70.

The plate member 72 carries pivot support arms 80 (FIGS. 18 and 19) and 82. Arms 84 and 86 of an intermediate member 88 (FIG. 12) are pivotally connected to the arms 80 and 82 by pivot pins 90 and 92, respectively. The intermediate member 88 includes a continuous flange 94 which surrounds a central opening 95 therein. The plate member 72 includes a similar continuous flange 96 surrounding the central opening 73 therein and opposed to the flange 94. A flexible tubular member 100 is mounted on and spans the flanges 94 and 96. A hollow scoop assembly 102 is mounted on the intermediate member 88. The scoop assembly 102 includes a flange 104, which is attached to a flange 106 of the intermediate member 88, and a forwardly extending tubular body 108. A scraper bar 110 is attached to a lower portion of a mouth of the tubular body 108 by rivets 111 (only one of which is shown). Snow enters through the mouth of the tubular body 108 and advances therethrough and through the opening 95 in the intermediate member, the tubular member 100, and the openings 73 and 70 in the plate member 72 and the wall of the main housing 22, respectively, to enter the interior of the main housing 22.

Figure 7:
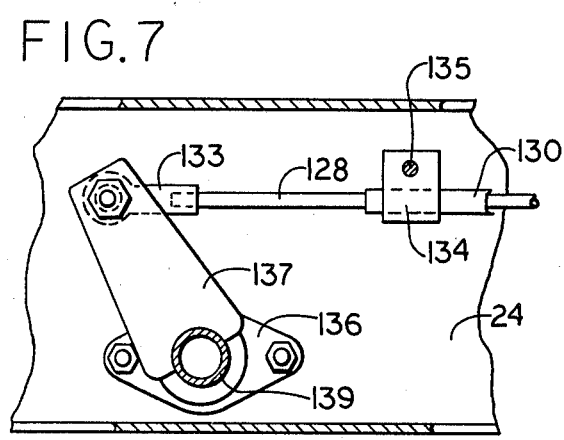
FIG. 7 is a view in section taken on an enlarged scale on the line 7—7 in FIG. 1.
Figure 8:
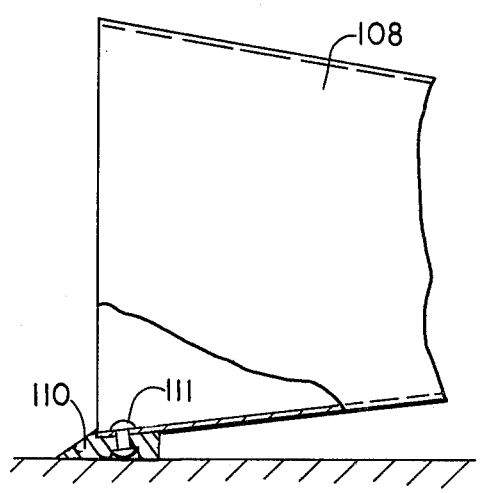
FIG. 8 is a view in section taken on an enlarged scale on the line 8—8 in FIG. 1.
Figure 13:
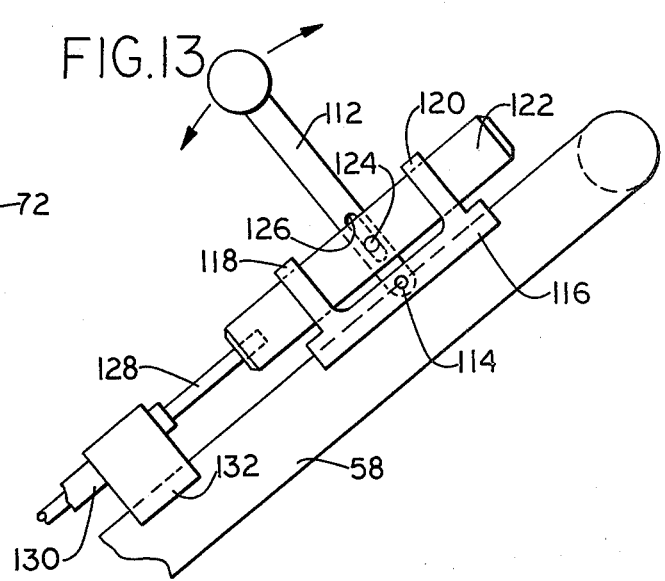
FIG. 13 is an enlarged view in side elevation showing details of an operating lever of the device.

The tubular body 108 of the scoop assembly 102 can be raised and lowered by action of a control handle 112. As shown in FIG. 13, the control handle 112 is pivotally mounted on a pivot pin 114 carried by a bracket 116 mounted on the arm 58 of the main handle 52. The bracket 116 also carries guides 118 and 120 which guide a sliding member 122 for movement lengthwise of the main handle arm 58. A pin 124 mounted in the sliding member 122 is received in a slot 126 in the control handle 112 so that swinging of the control handle 112 advances the sliding member 122 to the right or left as shown in FIG. 13. A control wire 128 is attached to the sliding member 122 and is slidable inside a guide tube 130. The upper end portion of the guide tube 130 is attached to the handle arm 58 by a bracket 132. A lower end portion of the tube 130 is held by a bracket 134 (FIG. 7) carried by a fastener 135 mounted in the main frame 26 (FIG. 2).

Figure 9:
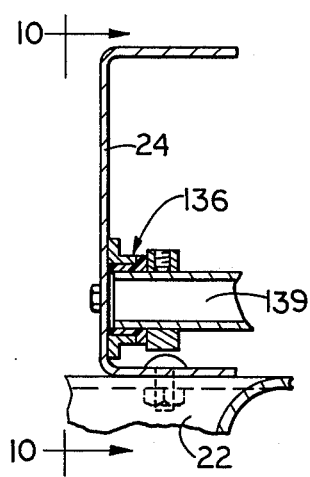
FIG. 9 is a view in section taken on an enlarged scale on the line 9—9 in FIG. 1.
Figure 10:
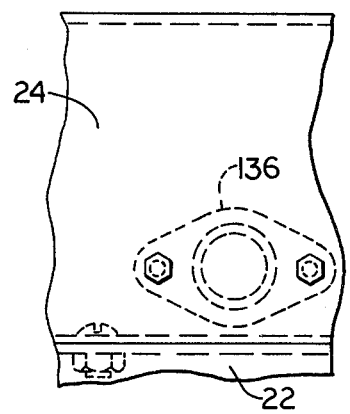
FIG. 10 is a fragmentary view in side elevation looking in the direction of the arrows 10—10 in FIG. 9.

A lower end portion of the control wire 128 is attached to a fitting 133 which is pivotally connected to a bifurcated crank arm 137. The crank arm 137 is mounted on a cross shaft 139. The cross shaft 139 is rotatably mounted in bearing assemblies 136 (FIGS. 7, 9 and 10), only one of which is shown, mounted on the main frames 24 and 26. Arms 138 (FIGS. 6 and 6A) mounted on the cross shaft 139 rotatably support a pin fitting 140. A link 142 carries a head 144 (FIG. 6A) which is rotatably mounted on the pin fitting 140. A hitch pin 145 holds the pin fitting 140 in position. A second head 146 (FIG. 1) at an opposite end of the link 142 is rotatably mounted on a pin 147 (FIG. 2). The pin 147 is carried between ring brackets 148 (FIG. 3) mounted on a generally inverted U-shaped strap 150. The strap 150 is attached to the tubular body 108 of the scoop member 102. Advancing of the control handle 112 to the right as shown in FIG. 2 causes raising of the tubular body 108. Movement of the control handle 112 to the left effects lowering of the tubular body 108.

A removable bottom plate 151 closes the bottom of the main housing 22. As shown in FIG. 5A, an outwardly extending flange 152 is formed on the lower portion of the main housing 22. An upwardly extending annular flange 154 is formed on the edge of the removable plate 151. The flange 154 surrounds a lower and outer edge of the flange 152 of the main housing 22. Removable clamping ring sections 156 of U-shape in cross section surround the flanges 152 and 154 to hold the plate 151 and the main housing 22 in assembled relation. Upstanding brackets 157 and 158 (FIG. 4) at ends of the clamping ring sections 156 (FIG. 4) are connected by clamp assemblies 160 (not shown in detail) which hold the clamping ring sections 156 in position.

A discharge chute 162 is mounted on the main housing 22 circumferentially spaced from the inlet opening 70 and in position to direct snow upwardly and to one side of the main housing 22.

The snow enters through the tubular body 108 and enters the main housing 22 through the opening 70. Inside the main housing 22, the snow is picked up by buckets 164 (FIGS. 14, 15 and 16) mounted on end portions of the rotating bar 50. Each of the buckets 164 includes a major wall 166, which extends inwardly from the upright wall 165 of the main housing 22 at a small positive rake angle R. The major wall 166 terminates in a vertical edge 167, which is in closely spaced relation with the wall 165. The major wall 166 is integrally formed with an outer horizontal portion 168 of the bar 50 and is connected thereto at a fold line 170. A transverse minor wall 172 is integrally formed with the major wall 166 at a fold line 174 and extends substantially at a right angle to the major wall 166. The buckets 164 rake and catch the snow entering the main housing 22 and eject the snow through the discharge opening 162 as the bar 50 rotates.

When the device is to be used for cutting grass, the scoop assembly 102 and the removable bottom plate 151 are removed. The hitch pin 145 is removed to permit removal of the pin fitting 140 and release of the link 142 so that the scoop assembly 102 can be raised to be released from the support assembly 731. The clamping assemblies 160 are released to permit removal of the clamping ring sections 156 and the bottom plate 151. A cover plate 178 is mounted on the support assembly 731 as shown in FIGS. 5 and 17 to close the opening 70. As shown in FIG. 14, leading sections of the outer horizontal portions of the bar 50 are sharpened so that when the bar 50 is rotated as the device is advanced through the grass, the grass is mowed in the usual fashion and ejected through the discharge chute 162.

The snow removing device illustrated in the drawings and described above is subject to structural modification without departing from the spirit and scope of the appended claims.

Having described our invention, what we claim as new and desire to secure by Letters patent is:

1. A device for removing snow which comprises a housing of inverted cup shape including an upright annular wall, a bottom plate removably mounted on the housing to close the lower side thereof, there being an inlet opening in the upright wall, a hollow scoop removably mounted on the housing in communication with the inlet opening, means for advancing the housing to cause snow to enter and advance along the scoop into the interior of the housing, a substantially horizontal bar rotatably mounted inside the housing, means for rotating the bar about an upright axis, bucket means mounted at end portions of the bar and engageable with the snow entering the housing, and tangential discharge conduit means communicating with the interior of the housing for discharging the snow.

2. A device as in claim 1 in which each of the buckets includes an upright lengthwise wall integral with a trailing edge of an outer portion of the bar and an upright transverse wall integral with an inner edge of the lengthwise wall.

3. A device as in claim 2 in which a leading edge of the outer portion includes a sharpened edge for cutting grass when the scoop and the bottom plate are removed.

4. A device as in claim 1 in which the scoop includes a hollow mounting plate and a tubular body pivotally mounted on the mounting plate, means on the housing for supporting the mounting plate in flatwise relation to the upright wall of the housing with the mounting plate in communication with the inlet opening, resilient tubular means connecting the opening in the mounting plate wth the interior of the tubular body, and means on the housing for supporting the tubular body at a selected height.

5. A device as in claim 4 in which the means for supporting the tubular body at a selected height includes a shaft rotatably mounted on the housing, a crank mounted on the shaft, a bracket mounted on the tubular body of the scoop and extending upwardly therefrom, a link connecting the crank and the bracket, and means for swinging the shaft for raising and lowering the tubular body of the scoop.

* * * * *